United States Patent [19]

Stutz et al.

[11] Patent Number: 4,635,216

[45] Date of Patent: Jan. 6, 1987

[54] LENGTH MEASURING DEVICE FOR A THREAD

[75] Inventors: Hansruedi Stutz, Dietlikon; Beat De Coi, Wetzikon, both of Switzerland

[73] Assignee: Loepfe Brothers Limited, Wetzikon, Switzerland

[21] Appl. No.: 593,105

[22] Filed: Mar. 26, 1984

[30] Foreign Application Priority Data

Mar. 29, 1983 [CH] Switzerland .................... 1737/83

[51] Int. Cl.[4] .................................................. G01B 7/04
[52] U.S. Cl. ...................................... 364/562; 33/129; 33/172 F
[58] Field of Search .................. 364/560, 562, 470; 377/19, 24; 33/126.5, 126.6, 127, 133, 333, 129, 172 F, 1 PT; 340/347 P

[56] References Cited

U.S. PATENT DOCUMENTS

| | | | |
|---|---|---|---|
| 3,564,219 | 2/1971 | Mutziger | 364/562 |
| 3,710,084 | 1/1973 | Slagley et al. | 364/562 |
| 3,898,436 | 8/1975 | Pottebaum | 377/24 X |
| 4,024,645 | 5/1977 | Giles | 33/129 |
| 4,356,638 | 11/1982 | McKenna et al. | 33/333 |
| 4,373,266 | 2/1983 | Stutz | 33/129 |
| 4,447,955 | 5/1984 | Stutz et al. | 33/129 |
| 4,476,576 | 10/1984 | Johnson | 340/347 P |

Primary Examiner—Gary Chin
Attorney, Agent, or Firm—Werner W. Kleeman

[57] ABSTRACT

A length measuring device for thread-like structures, especially textile threads, which are wound onto a cross-wound package or bobbin, possesses a substantially greater accuracy than heretofore known length measuring devices due to a more exact allowance for the geometric and kinematic relationships in the winding device. In particular, the slippage between the cross-wound package or bobbin and the winding drum can be taken into consideration in determining the length of the thread.

31 Claims, 14 Drawing Figures

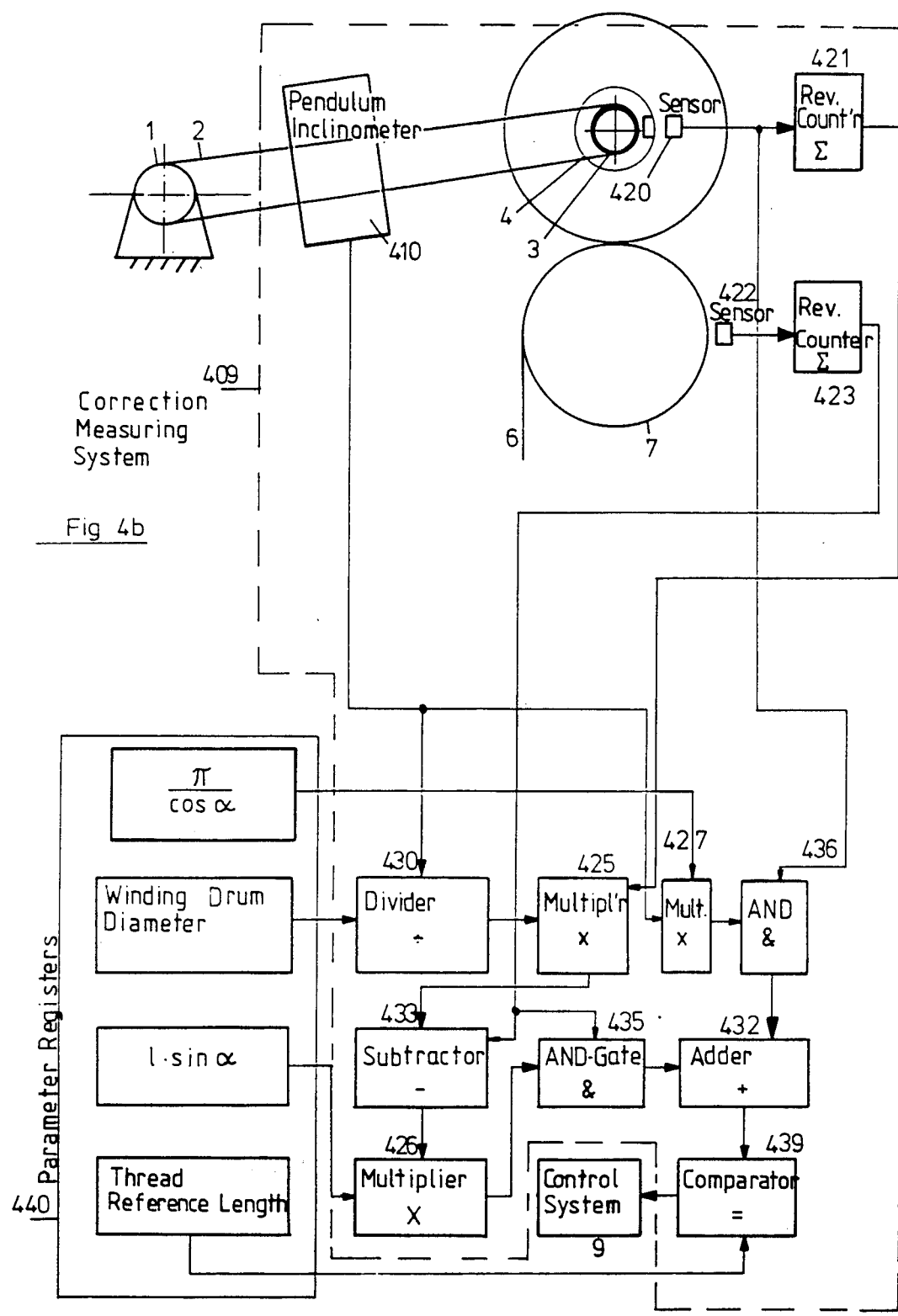

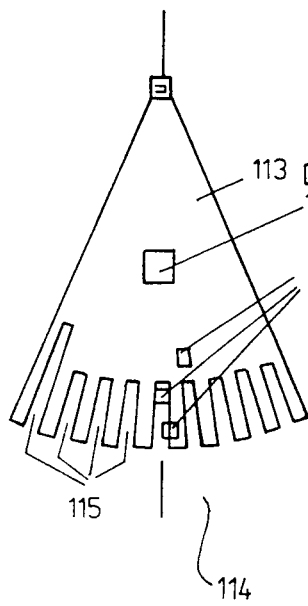
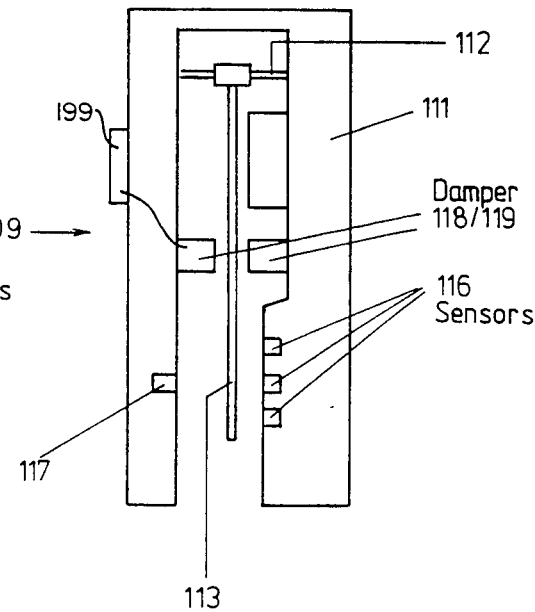

LENGTH MEASURING DEVICE FOR A THREAD

BACKGROUND OF THE INVENTION

The present invention broadly relates to a length measuring device for threads wound onto a cross-wound package, especially textile threads, wherein a measurement device on the cross-wound package senses the diameter with a diameter sensor and senses each revolution with a revolution sensor.

In a length measuring device known from the German Pat. No. 3,143,451 the pivotable tube carrier is connected to a display device by means of a mechanical drive or the like. The momentary position of the indicator member of the indicator or display device is sensed by optoelectronic sensors and the signals are digitally processed in an electronic circuit. An inductively driven revolution sensor transmits a pulse to the electronic circuit at each revolution of the yarn or thread coil or package. The electronic circuit determines the length of the yarn or thread being wound up by each revolution from the signals provided to it by the sensors and further determines the total length of all of the yarn or thread wound up by means of integration. Upon attaining a prescribed length of wound-up yarn or thread, the winding process is interrupted. The full package is replaced by an empty bobbin tube and a new winding operation is initiated.

SUMMARY OF THE INVENTION

Therefore, with the foregoing in mind, it is a primary object of the present invention to provide a new and improved construction of a thread measuring device which does not have associated with it the aforementioned drawbacks and shortcomings of the prior art constructions.

Another and more specific object of the present invention aims at providing a new and improved construction of a thread measuring device of the previously mentioned type permitting a greater degree of measuring accuracy in comparison to known devices.

Yet another further significant object of the present invention aims at providing a new and improved construction of a length measuring device of the character described and is relatively simple in construction and design, extremely economical to manufacture, highly reliable in operation, not readily subject to breakdown or malfunction, and requires a minimum of maintenance and servicing.

The length measuring device of the present invention importantly comprises: a measuring system, a parameter register system and a control system. The measuring system comprises: a diameter sensor generating a size signal and at least one revolution sensor generating a count signal. The parameter register system receives, in other words has input thereto, specific values relative to the thread-winding device and to the cross-wound package and transmits parameter signals corresponding to such values. The control system is provided to control a predetermined device and thus contains such specific values, such as the thread-winding deviceor associated bobbin-changing devices, etc. The thread measuring system is connected to the control system and to the parameter register system. The measuring system processes the size signal of the diameter sensor and the count signal of the revolution sensor as well as the parameter signals of the parameter register system according to the momentary geometric and kinematic configuration of the cross-wound package being wound and of the thread guidance and generates therefrom an output signal and transmits the output signal to the control system.

BRIEF DESCRIPTION OF THE DRAWINGS

The invention will be better understood and objects other than those set forth above, will become apparent when consideration is given to the following detailed description thereof. Such description makes reference to the annexed drawings wherein through the various Figures of the drawings there have been generally used the same reference characters to denote the same or analogous components and wherein:

FIG. 4b is a schematic representation of the fourth embodiment of the length measuring device;

FIG. 5a is a schematic representation of a diameter sensor for use with one of the embodiments of the length measuring device;

FIGS. 5b–5f are schematic representations of a pendulum body of the diameter sensor of FIG. 5a with various embodiments of a sensing code.

DETAILED DESCRIPTION OF THE PREFERRED EMBODIMENTS

Figure 1A:
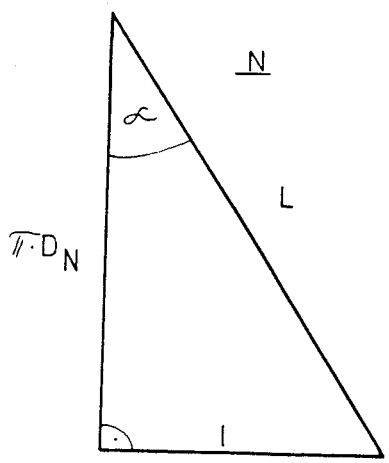
FIG. 1a is a diagramatic representation of the geometric relationships in a first embodiment of the length measuring device.
Figure 1A:
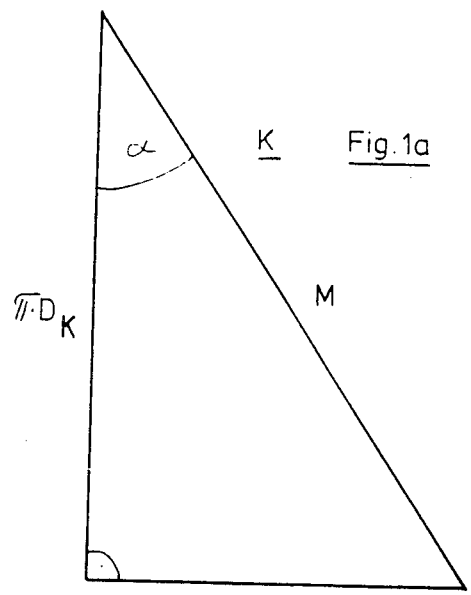

Describing now the drawings, it is to be understood that to simplify the showing of the drawings only enough of the structure of the length measuring device has been illustrated therein as is needed to enable one skilled in the art to readily understand the underlying principles and concepts of this invention. The illustrated exemplary embodiment of the length measuring device will be seen to comprise a package carrier 2 pivotably mounted on a shaft 1 journaled in the frame of a yarn or thread winding machine not particularly shown in FIG. 1b. The package or bobbin bearing 3 of the bobbin station is mounted at the free end of the bobbin carrier 2. The tube 4 for carrying the yarn or thread coil is slid onto the bobbin bearing 3 to form the cross-wound bobbin or package 5. The cross-wound package 5 is friction driven by a winding drum 7 which also guides the thread 6. All winding drums 7 of the multiple-station winding machine are mounted on the same drive shaft 8.

Due to this arrangement, the bobbin carrier 2 is pivoted out of an initial position at the beginning of the winding process by the growing diameter of the cross-wound package 5 in an upward direction until its attains a second or final position when the cross-wound package 5 is full. A diameter sensor 110 of a measurement system 109 is mounted on the bobbin carrier 2. The diameter sensor 110 is constructed as a pendulum inclinometer.

It will be seen from FIGS. 5a and 5f that the pendulum inclinometer 110 comprises a pendulum support frame 111 and a pendulum body 113 suspended in the pendulum support frame 110 by means of a tension band or tension cord 112. As the bobbin carrier 2 pivots in the counterclockwise direction of FIG. 5a, the pendulum support frame 111 is subjected to a counterclockwise rotation. The essentially freely suspended pendulum body 113 maintains a vertical orientation under the influence of gravity.

Mutually corresponding components of an angle sensing system 114 are mounted on the pendulum support frame 111 and the pendulum body 113. The angle measuring system or arrangement 114 comprises a code or code markings or coded information 115, a light source 117 for illuminating the code or coded markings 115 and a sensor device 116 mounted on the pendulum support frame 111 for sensing the code or coded markings 115. The sensor device or arrangement 116 generates a signal proportional to the angle of pendulum body relative to the pendulum support frame 111. The pendulum body 110 may comprise a damping means 118, which may be a magnet or magnets acting as an eddy current brake on the pendulum body 113.

Figure 5D:
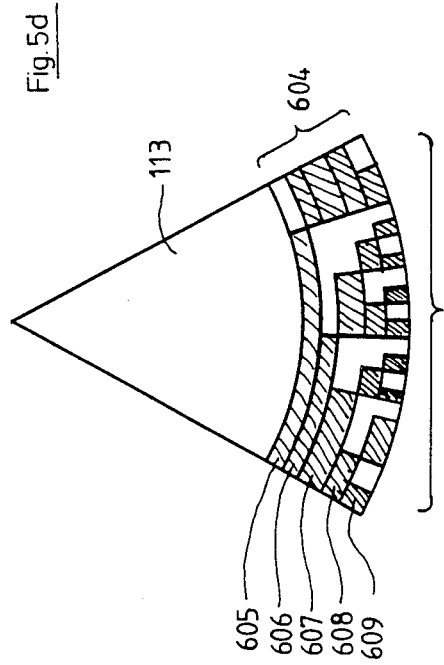
Figure 5E:
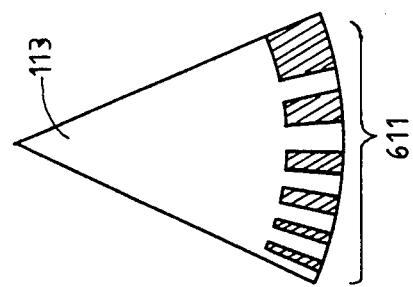
Figure 5B:
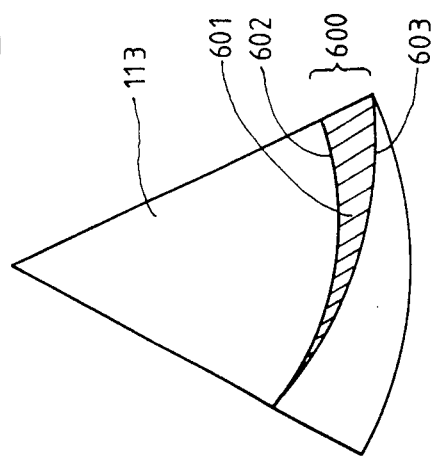

FIGS. 5b through 5f show various embodiments of the code or coded markings 115 in more detail. In FIG. 5b it will be seen that the code or coded marking 600 may comprise an optically differentiated region 601 of the pendulum body 113 bordered by spirally curved boundary lines 602 and 603. The momentary radius of curve 602 or of curve 603 maybe considered as a continuous code indicating the position of the pendulum body 113 within the pendulum support frame 111 or the momentary width of the region 601 enclosed by the curves 602 and 603 maybe considered as such continuous code.

Figure 5C:
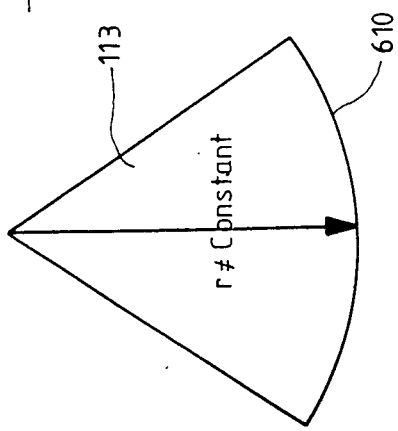

FIG. 5c shows an embodiment in which a lower curved edge 610 of the pendulum body 113 has a varying radius which serves as a continuous code indicating the angular position of the pendulum body 113 in the pendulum support frame 111. FIG. 5d shows a further embodiment of the code or coded markings 604 arranged in multiple tracks 605, 606, 607, 608 and 609. FIG. 5d schematically indicates that these multiple tracks may represent a binary coding. Other similar discrete or discontinuous codings, such as a Gray code, are also possible. FIG. 5e shows an embodiment of the code or coded markings 611 arranged as a single track bar code on the pendulum body 113. In the embodiment shown, the varying width of the individual markings serves to indicate the momentary angular position of the pendulum body 113 in the pendulum support frame 111. Other arrangements of known types of bar code could also be employed.

In FIGS. 5b, 5d and 5e, the cross hatched regions of the code markings 600, 604 and 611 maybe optically differentiated regions, for instance dark regions against a light background or transparent regions against an opaque background, or may be magnetically or inductively differentiated regions or the like. If such regions are optically differentiated regions, the pendulum support frame 111 may be provided with light-sensitive sensors 116 for detecting the code markings. The light source 117 mounted on the pendulum support frame 111 may illuminate the code or code markings. The light source 117 may be located on the same side of the pendulum body 113 as the sensors 116 to activate the sensors 116 by light reflected from the coded markings or it may be mounted on the opposite side of the pendulum body 113 to activate the sensors 116 by means of a transmitted light. The sensors 116 may be arranged in an array. The array may be arranged radial to or tangential to the path of the pendulum body.

The pendulum inclinometer arrangement 109 is provided with the damping means 118, 119 for suppressing variations of measurement values due to ecentric rotation of the cross-wound package 5. This damping means 118, 119 may be self-acting or may be controlled by an electronic supression circuit not particularly shown which responds to a special form of the code or coded markings 115 as detected by the sensors 116 or by a corresponding sensor means provided therefor.

This measuring device or arrangement 109 also comprises a revolution sensor 120 generally cooperating with the bobbin bearing 3 of the cross-wound package 5 which transmits a signal or pulse at each revolution of the cross-wound package 5 for counting the yarn or thread turns or windings on the package. This signal or pulse is transmitted to an input of an AND-gate 135 whose other input is connected to a multiplier 125. The inputs of the latter are respectively connected to the pendulum inclinometer 110 and a parameter register system or constant station 140.

A parameter or value corresponding to the pitch or winding angle $\alpha$ at the winding drum 7 is input to the multiplier 125 of the measuring device or arrangement 109 by the parameter register system 140. A summing integrator 132 is connected to the output of the AND-gate 135 which continuously determines the momentary length of the thread wound up on the cross-wound package 5.

A comparator 139 is connected to this summing integrator 132 and compares the momentary thread length with a reference thread length supplied to the comparator 139 by the parameter register system 140. When the reference thread length has been attained, the comparator 139 transmits a signal to a control device or system 9 connected to the comparator 139 which can shut down the thread-winding machinery or to other devices for initiating a fully automatic package swap including all auxiliary functions.

The measuring device or arrangement 109 continuously determines the diameter $D_K$ of the cross-wound package 5 without the intermediary of transmission means subject to mechanical clearance or play and precisely determines the thread length associated with each revolution. The pendulum support frame 111 of the pendulum inclinometer 110 precisely follows the movements of the cross-wound package 5 corresponding to the increase of its diameter and the pendulum body 113 remains constantly in the vertical position, especially in view of the damping means 118. The summing integrator 132 determines the momentary total length of thread by means of the pulses transmitted by the revolution sensor 120.

Thus it will be seen that, in the determination of the diameter of the cross-wound package 5, a substantial increase in the accuracy of the measurement of the thread length is obtained, on the one hand by the elimination of mechanical transmission members or drive means between the bobbin carrier 2 and the sensing device and, on the other hand, by the precise vertical positioning of the reference member without frictional or other mechanical losses between it and the rotating support member of the angle sensing device or arrangement.

Figure 1B:
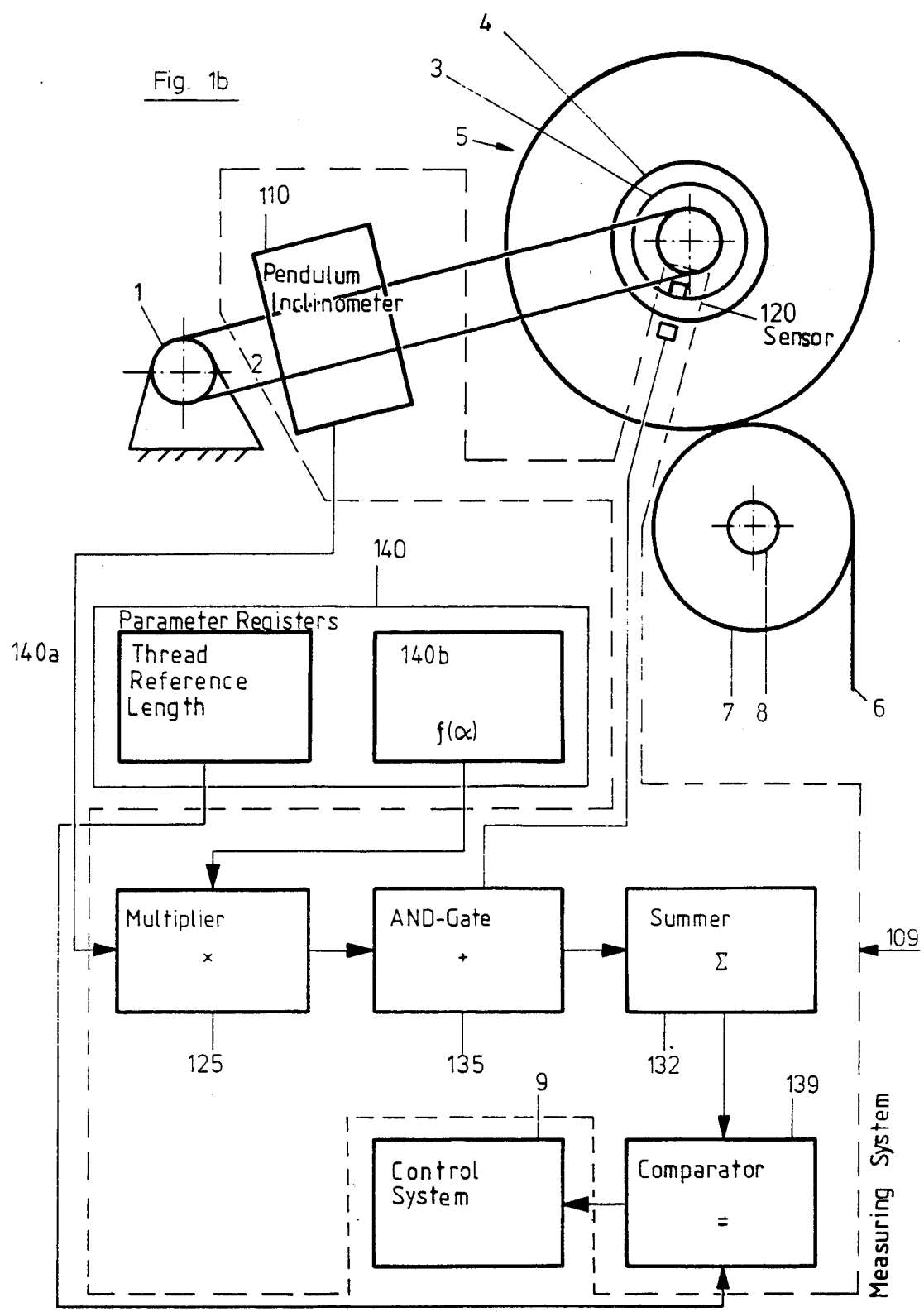
FIG. 1b is a schematic representation of a first embodiment of the length measuring device.

FIG. 1a shows the elementary geometric relationships for a first embodiment of the length measuring device. The following equations apply:

$$L = \frac{\pi \cdot D_N}{\cos \alpha}$$

$$\alpha = \arcsin \frac{1}{\pi \cdot D_N}$$

$$M_i = \frac{\pi \cdot D_{Ki}}{\cos \alpha}$$

$$M_{tot} = \sum_{i=1}^{n} M_i = \frac{\pi}{\cos \alpha} \sum_{i=1}^{n} D_{Ki}$$

In which:

$M_{tot}$ is the total thread length measured according to cross-wound package rotation.

$\pi$ is the constant value 3.141596.

i is the accumulated number of rotations of the cross-wound package.

$D_N$ is the diameter of the winding drum.

$D_{Ki}$ is the diameter of the cross-wound package at the $i^{th}$ rotation.

$\alpha$ is the winding angle of the thread on the cross-wound package and of the winding drum.

$D_K$ is the diameter of the cross-wound package (as measured).

L is the length of the wound-up thread for a single rotation of the winding drum.

M is the length of the wound-up thread for a single revolution of the cross-wound package.

l is the width of the thread spacing on the cross-wound package corresponding to one revolution of the winding drum.

n is the number of windings or turns on the cross-wound package.

Figure 2A:
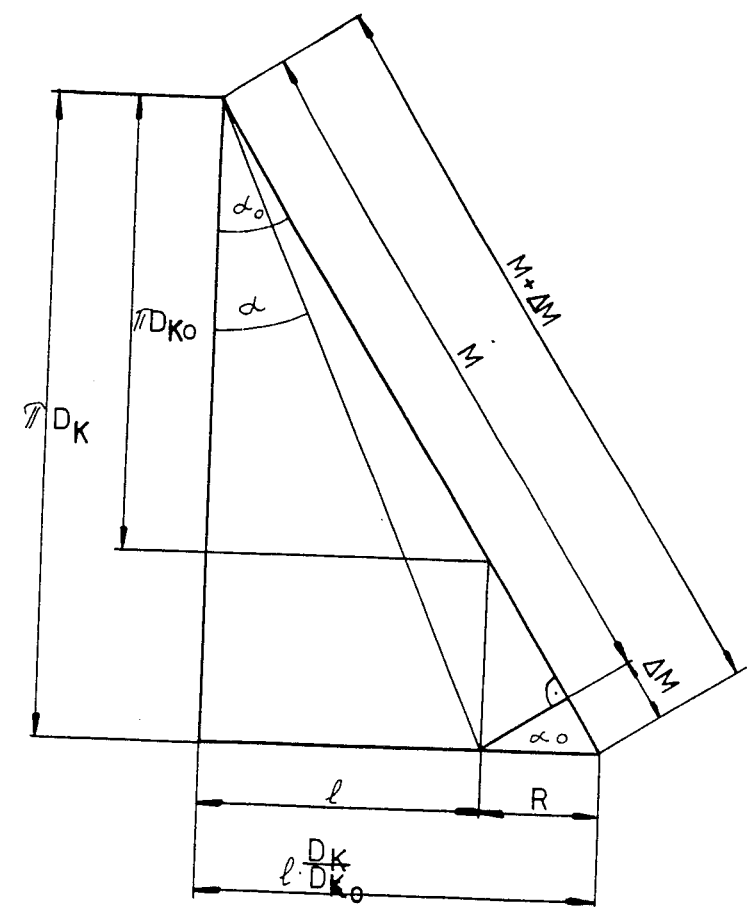
FIG. 2a is a diagramatic representation of the geometric relationships in a second embodiment of the length measuring device.
Figure 2B:
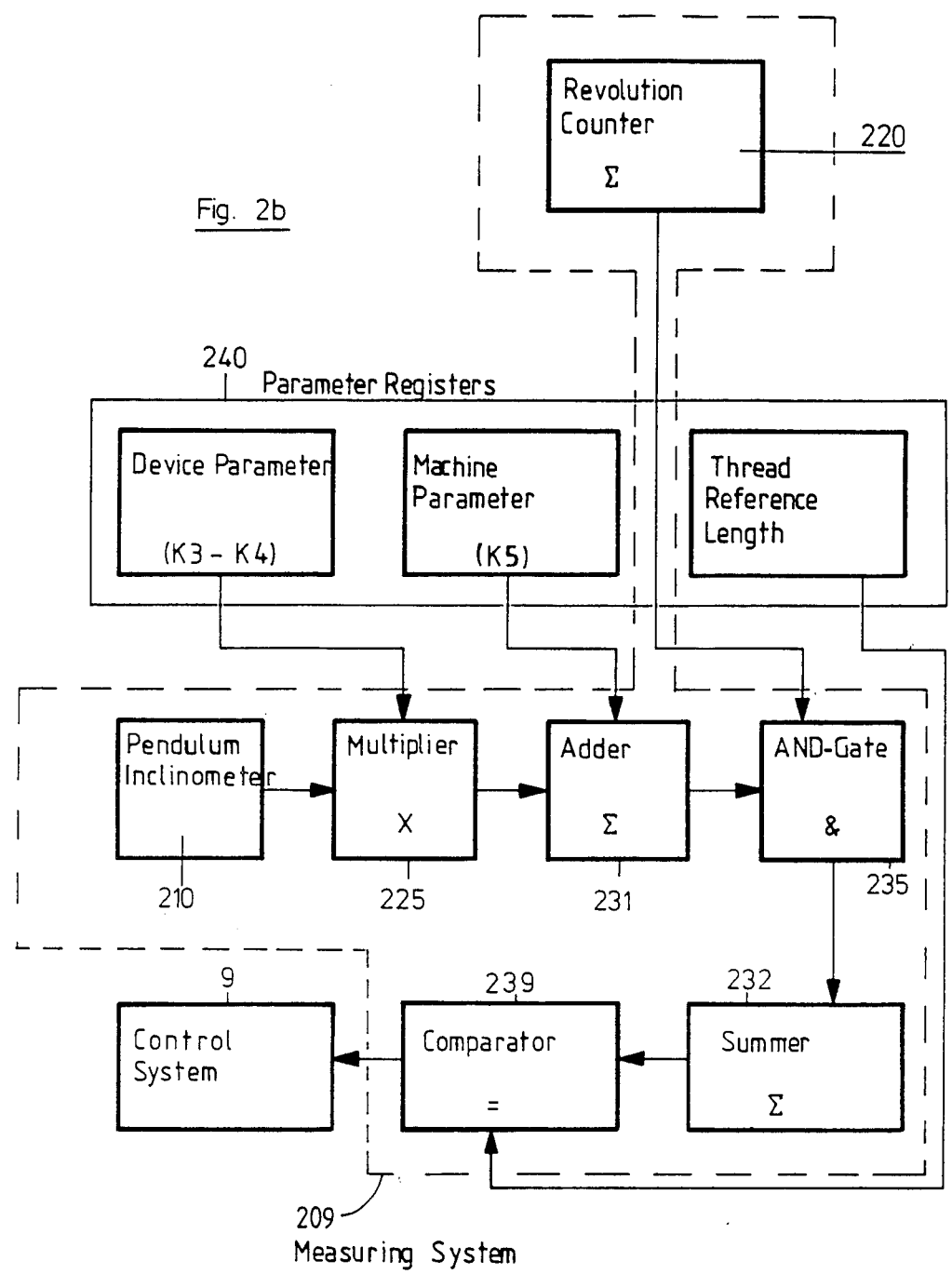
FIG. 2b is a schematic representation of the second embodiment of the length measuring device.

In another embodiment of the length measuring device shown in FIG. 2b, the measurement device or arrangement comprises a pendulum inclinometer 210 for sensing the diameter $D_K$ of the cross-wound package 5 which is connected to an input or input terminal of a multiplier 225. A parameter register system 240 is connected to the other input of the multiplier 225 for inputting a value (K3−K4) relative to the winding device. An input or input terminal of an adder 231 is connected to the output or output terminal of the multiplier 225 and its other input is also connected to the parameter register system 240 for inputting a prescribable or selectable machine value K5, a factor dependent upon the winding angle α. Subsequent to the adder 231 in the circuit is an AND-gate 235 which is also connected to the revolution sensor 220 of the cross-wound package 5. A summing integrator or counter 232 receives the output signal of the AND-gate 235 and determines the momentary total length of the thread. A comparator 239 receives the signal corresponding to the momentary total length of the thread. A second input of the comparator 239 is connected to the parameter register system 240 and compares the momentary total length of thread with a reference length of the thread. If the two lengths agree, the comparator 239 transmits a signal to a control system or arrangement 9 for shutting down the thread-winding machinery or to other devices for initiating a fully automatic bobbin change or the like.

The geometric relationships shown in FIG. 2a form the basis of the latter embodiment. Elementary calculations in relation to FIG. 2a yield the following relationships:

$$R = 1\left(\frac{D_{Ki}}{D_{Ko}} - 1\right)$$

$$M_i = \frac{\pi \cdot D_{Ki}}{\cos \alpha}$$

$$M_i + \Delta M_i = \frac{\pi \cdot D_{Ki}}{\cos \alpha_o}$$

$$\Delta M_i = 1\left(\frac{D_{Ki}}{D_{Ko}} - 1\right) \cdot \sin \alpha_o$$

(as permissible approximation)

$$M_i = \frac{\pi \cdot D_{Ki}}{\cos \alpha_o} - 1 \cdot \left(\frac{D_{Ki}}{D_{Ko}} - 1\right) \cdot \sin \alpha$$

with the substitutions:

$$K3 = \frac{\pi}{\cos \alpha_o}$$

$$K4 = \frac{1}{D_{Ko}} \cdot \sin \alpha_o$$

$$K5 = 1 \cdot \sin \alpha_o$$

one obtains the result:

$$M_{tot} = \sum_i M_i = \sum_i [D_{Ki}(K3-K4)+K5]$$

In which:

$M_{tot}$ is the total thread length measured according to cross-wound package rotation.

$D_K$ is the cross-wound package diameter.

$D_{Ko}$ is the cross-wound package diameter at the start of winding.

$\alpha_o$ is the winding angle of the thread at start of winding.

$\alpha$ is the winding angle of the thread.

R is the reduction of the thread spacing.

$M_i$ is the thread length at the $i^{th}$ cross-wound package revolution.

$\Delta M_i$ is the reduction of the thread length at the $i^{th}$ cross-wound package revolution due to a decreasing value of the winding angle α.

i is the number of cross-wound package revolutions where i can vary from 1 to m.

This embodiment of the length measuring device is suited for employment on a thread-winding machine in which the thread spacing is inevitably coupled to the cross-wound package drive in a fixed but adjustable relationship. This causes the winding angle α of the thread to change in relation to the increasing package diameter as determined by the thread-winding machinery. (In the simplest case, 1 remains constant with increasing cross-wound package diameter.)

Figure 3A:
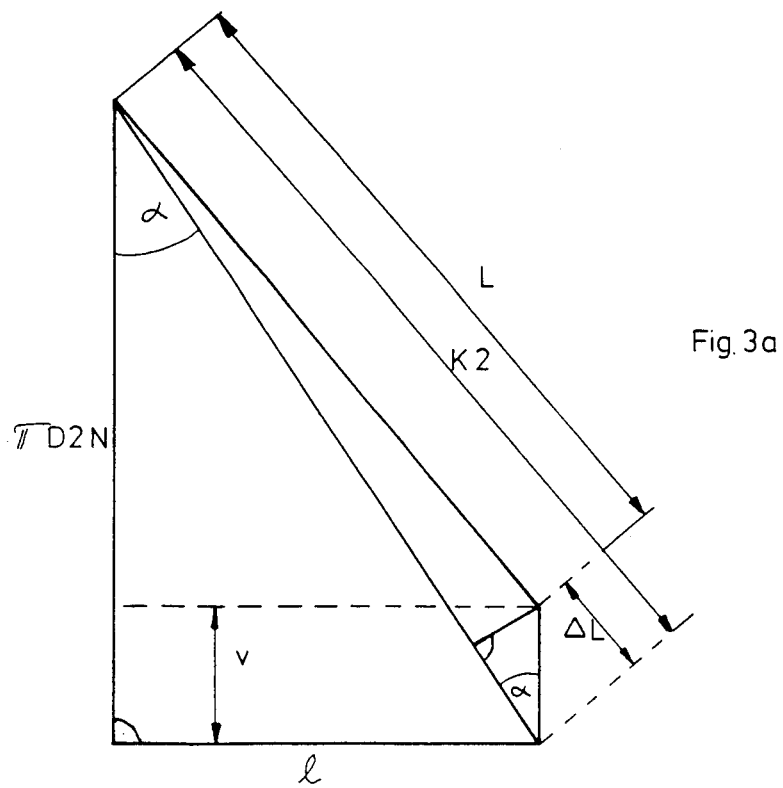
FIG. 3a is a diagramatic representation of the geometric relationships in a third embodiment of the length measuring device.
Figure 3B:
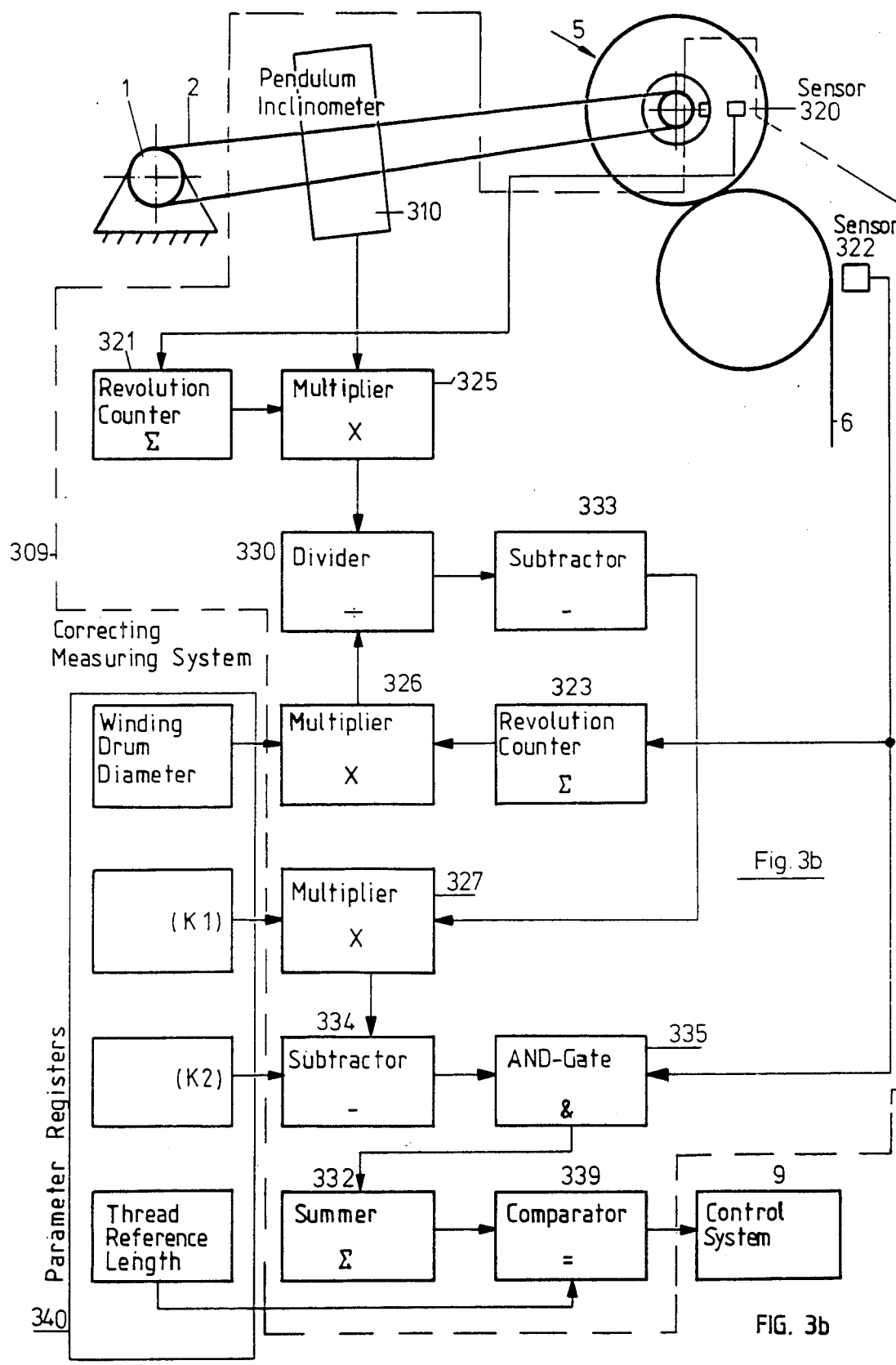
FIG. 3b is a schematic representation of the third embodiment of the length measuring device.

A further improvement in thread length measurement is obtained by a further embodiment of the length measuring device shown in FIG. 3b. In this embodiment, a correcting measuring system or arrangement 309 takes into consideration the principally varying slippage in the friction drive of the cross-wound package 5 by the winding drum 7 as an approximative average value.

A pendulum inclinometer 310 transmits a signal representing the diameter of the cross-wound package 5 to a first multiplier 325. A second input of this multiplier 325 receives a signal representing the number of revolutions of the cross-wound package 5 from a revolution counter 321 of the cross-wound package 5 which is connected to a revolution sensor 320 of the cross-wound package 5. A divider 330 is connected to a first multiplier 325 and a second multiplier 326. The second multiplier 326 receives signals from a winding drum revolution counter 323 having a revolution sensor 322 and from the parameter register system 340 for the winding drum diameter $D_N$. The output of divider 330 is connected to a first subtractor 333. The latter is connected to a third multiplier 327. A second input of the latter is connected to the parameter register system 340 for inputting the value K1 which is a first factor dependent upon the thread-winding angle $\alpha$. A second subtractor 334 is connected to the output of the third multiplier 327 and receives signals for the value K2, a second factor dependent upon the cross-wound package diameter, from the parameter register system 340 and, in turn, transmits signals to AND-gate 335. The other input of the latter is connected to the revolution sensor 323 of the winding drum 7. A summing integrator 332 is connected to the output of the AND-gate 335 for forming the momentary total sum of the thread length. The signal corresponding to the total sum of the thread length is transmitted to a comparator 339 which is connected to the parameter register system 340 for inputting the reference length of the thread. When the reference thread length has been reached, the comparator transmits a signal to a control system or arrangement 9 for controlling the machinery for manually or fully automatically changing bobbins.

The geometric relationships for this embodiment of the length measuring device are shown in FIG. 3a. The definition of the slippage can be derived from these relationships:

$$s_i = 1 - \frac{-n_{Ki} \cdot D_{Ki}}{n_N \cdot D_N} \quad (s = 0 \text{ for } n_K D_K = n_N D_N)$$

$$v_i = S_i \pi D_N$$

$$\Delta L = S_i \pi D_N \cdot \cos \alpha$$

(this approximation is permissible in practice)

$$K_1 = \pi D_N \cdot \cos \alpha = \text{constant}$$

$$\Delta L_i = K_1 \cdot S_i$$

$$L_i = K_2 - K_1 \cdot S_i$$

$$L_{tot} = \sum_{i=1}^{m} L_i = m \cdot K_2 - K_1 \sum_{i=1}^{m} S_i$$

In which:

$L_i$ is the length of the wound up thread after the $i^{th}$ revolution.

$L_{tot}$ is the total length.

$s_i$ is the slippage between the winding drum and the cross-wound package for the $i^{th}$ cross-wound package revolution and the $i^{th}$ cross-wound package diameter.

$n_{Ki}$ is the number of cross-wound revolutions associated with the diameter $D_{Ki}$.

$D_{Ki}$ is the $i^{th}$ cross-wound package diameter.

$n_N$ is the number of revolutions of the winding drum.

$D_N$ is the diameter of the winding drum.

$\alpha$ is the winding angle of the thread on the winding drum.

$K_2$ is the length of the wound-up length of thread per winding drum revolution without slippage (constant).

$K_1$ is $\pi \cdot D_N \cdot \cos \alpha = $ Constant

V is the apparent reduction of the winding drum circumference due to slippage.

$\Delta L$ is the reduction of the length of thread wound up on the cross-wound package due to slippage.

i is the number of winding drum revolutions.

In a further embodiment of the length measuring device shown in FIG. 4b, a diameter sensor of a correcting measuring system or arrangement 409, which is preferably constructed as a pendulum inclinometer 410 for sensing the diameter $D_K$ of the cross-wound package 5, is connected to the input of a divider 430 whose other input is connected to the parameter register system 440 for inputting the diameter $D_N$ of the winding drum. The signal of the divider is transmitted to a first multiplier 425 which also receives a signal from the cross-wound package revolution counter 421 which, in turn, is connected to the revolution sensor 420 of the cross-wound package 5. The first multiplier 425 sends a signal to a subtractor 433 which also receives signals from the winding drum revolution counter 423 which is connected to a revolution sensor 422 of the winding drum 7. A second multiplier 426 is connected to the subtractor 433. Values 1-sin $\alpha$ are transmitted to the second multiplier 426 by the parameter register system 440. A first AND-gate 435 is connected to the output of the second multiplier 426 and is also connected to the winding drum revolution counter 423 or to a revolution counter of the winding drum 7. The first AND-gate 435 is connected to an input of a summing integrator 432 whose other input receives signals from a second AND-gate 436 which, in turn, is connected on the one hand to the revolution sensor 420 of the cross-wound package 5 and on the other hand to a third multiplier 427. The latter is connected to the diameter sensor 410 and to the parameter register system 440 for inputting a value for $$\frac{\pi}{\cos \alpha}.$$

The summing integrator 432 forms or determines the momentary total thread length and supplies it to a comparator 439 which receives the reference thread length from the parameter register system 440 and compares the two values. If the two values are the same, the comparator transmits a signal to a control system or arrangement 9 which controls the thread-winding machinery. For instance, the thread-winding machinery or only a portion thereof can be shut down or it is also possible to initiate further machine functions.

Figure 4A:
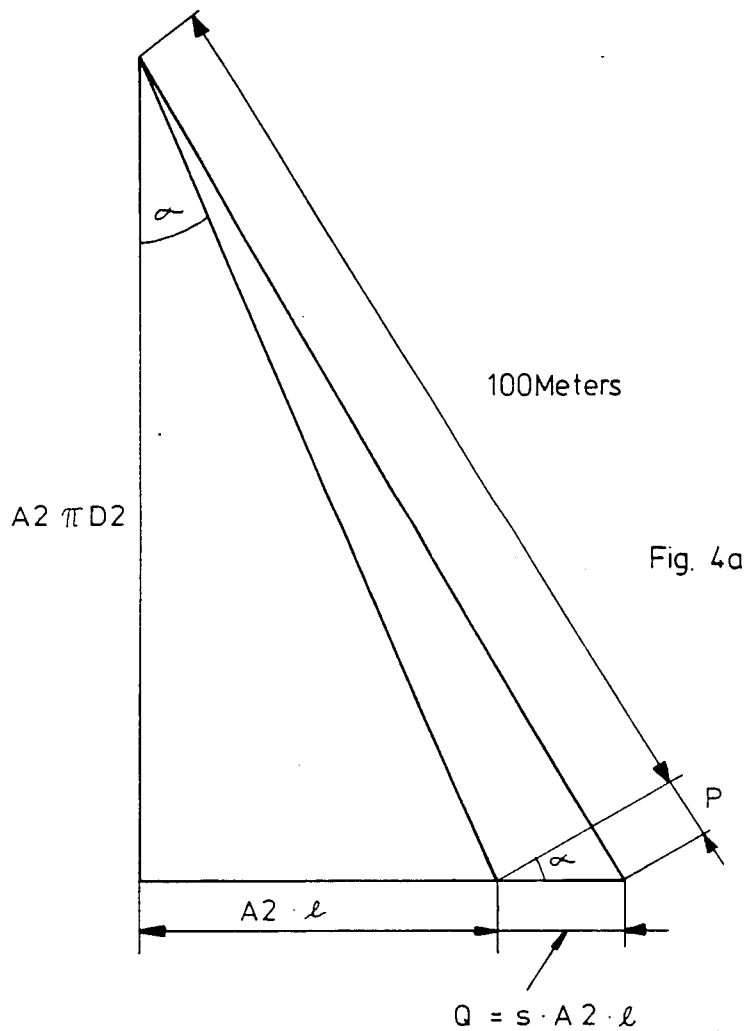
FIG. 4a is a diagramatic representation of the geometric relationships in a fourth embodiment of the length measuring device.

The geometric relationships associated with this embodiment of the length measuring device are represented in FIG. 4a.

Q is the increase in the width of the thread spacing due to slippage.

$A_K$ is the number of cross-wound package revolutions per 100 meters.

$A_N$ is the number of winding drum revolutions per 100 meters without slippage.

$A_{NSj}$ is the number of winding drum revolutions per 100 meters with slippage.

$A_N$·1 is the total width of the thread spacing per 100 meters of thread.

p is the increase in length of the thread due to slippage per 100 meters.

j is the number of groups of revolutions of the cross-wound package per 100 meters of wound-up thread elapsed until the reference thread length is attained.

If the slippage is defined by:

$$S_j = \frac{ANS_j}{AN} - 1$$

and if it is taken into consideration that the winding angle of the cross-wound package is greater than it is on the winding drum ($\alpha$) due to slippage, then the result is obtained that:

$$A = S_j \cdot AN \cdot 1$$

To a degree of approximation acceptable in practice, this can be written:

$$P_j = Q \cdot \sin \alpha = S_j \cdot AN \cdot 1 \cdot \sin \alpha.$$

If $$A_N = \frac{D_K}{D_N} \cdot AK,$$

then $$P_j = \left( A_{NS} - \frac{A_K D_K}{D_N} \right) \cdot 1 \cdot \sin \alpha$$

To a degree of approximation which is acceptable in practice, 1·sin $\alpha$ = Constant.

Thus, the following approximation is obtained, which is acceptable in practice:

$$L_{tot} = \sum_j L_{Sj} = \frac{\pi}{\cos \alpha} \sum_j D_{Kj} + \sum_j P_{Kj}$$

In the various embodiments of the invention, measuring revolutions in a given period of time or interval could be employed in the place of revolution counters typically measuring revolutions per minute without affecting the functioning of the device.

In practical experiments with the length measuring devices which take the slippage into consideration in the above mentioned manner, substantially improved accuracy has been obtained relative to heretofore known devices.

The length measuring device of this invention can be employed for all thread-like structures. It is particularly suited for textile, plastic, metallic and mineral fiber threads and the like.

While there are shown and described present preferred embodiments of the invention, it is to be distinctly understood that the invention is not limited thereto, but may be otherwise variously embodied and practiced within the scope of the following claims. Accordingly,

What we claim is:

1. A length measuring device for determining when a desired length of a thread has been wound up on a cross-wound package in a thread-winding device, especially a textile thread, wherein the diameter of the cross-wound package is sensed and each revolution thereof is sensed, comprising:
    a measuring system including:
        a diameter sensor for sensing the diameter of the cross-wound package and for generating a diameter size signal indicative of the sensed diameter;
        at least one revolution sensor for sensing each revolution of the cross-wound package and for generating a revolution count signal indicative of each sensed revolution;
    the thread-winding device having kinematic characteristics and the cross-wound package having geometric characteristics representable by predeterminate parameters;
    a parameter register system for containing said predeterminate parameters relative to the thread-winding device and to the cross-wound package and for transmitting parameter signals indicative of said predeterminate parameters;
    a control system for controlling a predetermined device;
    said measuring system being connected to said control system and to said parameter register system;
    said predeterminate parameters including a reference value of the length of the thread corresponding to the desired length of the thread; and
    said measuring system being provided for processing said diameter size signal of said diameter sensor and said revolution count signal of said revolution sensor as well as said parameter signals of the parameter register system indicative of momentary values of said geometric and kinematic characteristics and for generating therefrom an output signal indicative of substantial equality between a momentary value of the length of thread wound up on the cross-wound package and said reference value and for transmitting said output signal to said control system.

2. The length measuring device as defined in claim 1, wherein:
    said predetermined device controlled by said control system is the thread-winding device.

3. The length measuring device as defined in claim 1, wherein:
    said predetermined device controlled by said control system is a machine distinct from the thread-winding device.

4. The length measuring device as defined in claim 1, wherein:
    said measuring system comprises:
        a multiplier having a first input, a second input and an output;
        an AND-gate having a first input, a second input and an output;
        a summing integrator having an input and an output;
        a comparator;
    said summing integrator being provided for continuously determining a momentary value of the length of the thread wound up on the cross-wound package;
    said first input of said multiplier being connected to said diameter sensor;

said predeterminate parameters including the value $\pi/\cos\alpha$;

said second input of the multiplier being connected to said parameter register system for inputting said value $\pi/\cos\alpha$ from the parameter register system to said multiplier;

said first input of said AND-gate being connected to said output of the multiplier;

said second input of the AND-gate being connected to said revolution sensor of the cross-wound package;

said input of said summing integrator being connected to said output of the AND-gate;

said parameter register system comprising means for selecting said reference value of the length of the thread corresponding to the desired length;

said comparator being connected to said output of the summing integrator for comparing said momentary value of the length of the thread wound up on the cross-wound package with said reference value of the length of the thread selected at the parameter register system; and said comparator being provided for generating and for transmitting said output signal to said control system of said predetermined device, wherein:

$\alpha$ is the winding angle of the thread being wound; and $\pi$ is the constant value 3.141596.

5. The length measuring device as defined in claim 1, wherein:

the cross-wound package comprises a winding tube having a diameter;

said measuring system comprising:
  a multiplier having a first input, a second input and an output;
  an adder having a first input, a second input and an output;
  an AND-gate having a first input, a second input and an output;
  a summing integrator having an input and an output;
  a comparator having a first input, a second input and an output;
  said first input of said multiplier being connected to said diameter sensor;
  said predeterminate parameters including a value of said diameter of said winding tube of said cross-wound package;
  said second input of the multiplier being connected to said parameter register system for receiving said value of said diameter of said winding tube of said cross-wound package;
  said first input of said adder being connected to said output of the multiplier;
  said predeterminate parameters including a winding value indicative of a winding angle of the thread being wound;
  said second input of the adder being connected to the parameter register system for inputting said winding value therefrom;
  said first input of said AND-gate being connected to said output of the adder;
  said second input of the AND-gate being connected to said revolution sensor of the cross-wound package;
  said input of said summing integrator being connected to said output of the AND-gate for determining a momentary value of a total length of the thread wound on the cross-wound package and for transmitting a signal indicative of said mementary value of said total length to said first input of said comparator;
  said predetermined parameters including a reference value of the length of the thread corresponding to the desired length of the thread;
  said second input of the comparator being connected to the parameter register system for inputting said reference value of the length of the thread;
  said control system being connected to said output of the comparator; and
  the comparator being provided for comparing said momentary value of said total length with said reference value and for generating and transmitting said output signal to the control system upon determining that said substantial equality between said momentary value of said total length and said reference value of the length has been attained.

6. The length measuring device as defined in claim 1, further including:

a winding drum having a diameter for driving the cross-wound package;

the thread being wound on the cross-wound package being subject to a slippage relative to the winding drum driving said cross-wound package and guiding said thread; and said measuring system comprising a compensating measurement system operatively connected with said measuring system, said parameter register system and said control system for correcting the length measurement to compensate for said slippage.

7. The length measuring device as defined in claim 6, wherein:

said compensating measurement system comprises:
  a winding drum revolution counter;
  a winding drum revolution sensor;
  a first multiplier having a first input, a second input and an output;
  a second multiplier having a first input, a second input and an output;
  a third multiplier having a first input, a second input and an output;
  a divider having a first input, a second input and an output;
  a first subtractor having a first input, a second input and an output;
  a second subtractor having a first input, a second input and an output;
  an AND-gate having a first input, a second input and an output;
  a comparator having a first input, a second input and an output;
  a summing integrator having an input and an output;
  said first input of said first multiplier being connected to said diameter sensor;
  said second input of the first multiplier being connected to said revolution counter of the cross-wound package;
  the revolution counter of the cross-wound package being connected to said revolution sensor of the cross-wound package;
  said first input of said divider being connected to said output of the first multiplier;
  said second input of the divider being connected to said output of said second multiplier;
  said first input of the second multiplier being connected to said winding drum revolution counter;

said winding drum revolution counter being connected to said winding drum revolution sensor;

said predeterminate parameters including a value of said diameter of said winding drum;

said second input of the second multiplier being connected to said parameter register system for inputting said value of the diameter of the winding drum;

said first input of said first subtractor being connected to said output of the divider;

said first input of said third multiplier being connected to said output of the first subtractor;

said predetermined parameters including a value of a first predetermined constant indicative of a winding angle of the thread being wound;

said second input of the third multiplier being connected to the parameter register system for inputting a signal corresponding to said value of said first predetermined constant;

said first input of said second subtractor receiving an output signal being connected to said output of the third multiplier;

said predeterminate parameters including a second predetermined constant indicative of the diameter of the cross-wound package;

said second input of the second subtractor being connected to the parameter register system for inputting a value of said second predetermined constant;

said first input of said AND-gate being connected to said output of the second subtractor;

said second input of the AND-gate being connected to the winding drum revolution counter;

said second subtractor being provided for forming a value;

said output terminal of the AND-gate transmitting said value formed by the second subtractor to said input terminal of said summing integrator upon receiving from said winding drum revolution counter a revolution count signal;

said first input of said comparator being connected to said output of the summing integrator;

said predeterminate parameters including said reference value of the length of the thread corresponding to the desired length;

said second input of the comparator being connected to the parameter register system for inputting said reference value of the length of the thread; and said output of the comparator being provided for transmitting a control signal to said control system as a function of the result of a comparison operation performed by the comparator.

8. The length measuring device as defined in claim 6, wherein:

said compensating measurement system comprises:
said parameter register system;
a revolution counter of the cross-wound package;
a winding-drum revolution counter;
a first multiplier having a first input, a second input and an output;
a second multiplier having a first input, a second input and an output;
a third multiplier having a first input, a second input and an output;
a divider having a first input, a second input and an output;
a subtractor having a first input, a second input and an output;
a first AND-gate having a first input, a second input and an output;
a second AND-gate having a first input, and a second input;
a summing integrator having an input and an output;
a comparator having a first input, a second input and an output;

said first input of said first multiplier being connected to said output of said divider;

said predeterminate parameters including a value of said diameter of said winding drum;

said first input of said divider being connected to said parameter register system for inputting said value of the diameter of the winding drum;

said second input of the divider being connected to said diameter sensor;

said second input of the first multiplier being connected to said revolution counter of the cross-wound package;

the revolution counter of the cross-wound package being connected to said revolution sensor of the cross-wound package;

said output of the first multiplier being provided for transmitting a signal to said first input of said subtractor;

said second input of the subtractor being connected to said winding drum revolution counter;

said first input of said second multiplier being connected to said output of the subtractor;

said predeterminate parameters including a value of a factor indicative of the winding angle of the thread being wound;

said second input of the second multiplier being connected to the parameter register system for inputting said value of said factor indicative of the winding angle of the thread;

said first input of said first AND-gate being connected to said output of the second multiplier;

said second input of said first AND-gate being connected to the winding drum revolution counter;

said output of said first AND-gate being provided for transmitting a signal to said input of said summing integrator;

said input of the summing integrator being connected to said first input of said second AND-gate;

said second input of the second AND-gate being connected to said output of said third multiplier;

said predeterminate parameters including the value $\pi/\cos \alpha$;

said first input of the third multiplier being connected to the parameter register system for inputting therefrom said value $\pi/\cos \alpha$;

said second input of the third multiplier being connected to the diameter sensor;

the summing integrator being provided for determining in dependence of a counted number of revolutions of the cross-wound package and together with an output signal of the third multiplier a value of the total length of the thread wound on the winding drum;

said output of the summing integrator being provided for transmitting said value of the total length of thread as a signal to said first input of said comparator;

said predeterminate parameters including said value of said reference length;

the comparator being provided for performing a comparison operation by comparing said signal of the summing integrator to said value of said reference length of the thread supplied by the parameter register system to said second input of the comparator; and said output of the comparator being provided for transmitting a control signal corresponding to the result of said comparison operation performed by the comparator to said control system.

9. The length measuring device as defined in claim 1, wherein:
the thread-winding device comprises a tube carrier for carrying the cross-wound package;
said diameter sensor of the cross-wound package comprising a pendulum inclinometer device rigidly connected to said tube carrier of the cross-wound package.

10. The length measuring device as defined in claim 9, wherein:
said pendulum inclinometer device comprises;
a pendulum support frame;
a pendulum body suspended therefrom;
components of a sensing system; and
said components of said sensing system being arranged upon the pendulum body and upon the pendulum support frame to cooperate with one another for generating a signal corresponding to an angle formed between said pendulum body and said pendulum support frame.

11. The length measuring device as defined in claim 10, wherein:
said sensing system comprises:
a coded information arranged upon said pendulum body;
a light source illuminating said coded information; and
an optical sensing arrangement for optically sensing the coded information.

12. The length measuring device as defined in claim 11, wherein:
said coded information is contained in a continuous code.

13. The length measuring device as defined in claim 12, wherein:
said continuous code is contained in an optically differentiated region defined by two spiral curves.

14. The length measuring device as defined in claim 12, wherein:
said continuous code is contained in a curved edge of said pendulum body.

15. The length measuring device as defined in claim 11, wherein:
said coded information is contained in a discrete code.

16. The length measuring device as defined in claim 15, wherein:
said discrete code is contained in a bar code.

17. The length measuring device as defined in claim 15, wherein:
said discrete code is contained in a single track discrete code.

18. The length measuring device as defined in claim 15, wherein:
said discrete code is contained in a multiple track discrete code.

19. The length measuring device as defined in claim 11, wherein:
said optical sensing arrangement for optically sensing said coded information comprises a light-sensitive array arranged tangential to the path of said pendulum body corresponding to the arrangement of said coded information.

20. The length measuring device as defined in claim 11, wherein:
said optical sensing arrangement for optically sensing said coded information comprises a light-sensitive array arranged radial to the path of said pendulum body and corresponding to the arrangement of said coded information.

21. The length measuring device as defined in claim 11, wherein:
said optical sensing arrangement for optically sensing said coded information comprises means for suppressing variations of measurement values due to eccentric rotation of the cross-wound package.

22. The length measuring device as defined in claim 21, wherein:
said means for suppressing variation of measurement values comprises a special form of said coded information and corresponding sensor means for reading said special form of the coded information.

23. The length measuring device as defined in claim 21, wherein:
said means for supressing variation of measurement values comprises an electronic suppression circuit.

24. The length measuring device as defined in claim 21, wherein:
said means for suppressing variation of measurement values comprises damping means.

25. The length measuring device as defined in claim 24, wherein:
said damping means comprises at least one magnet acting as an eddy current brake on said pendulum body.

26. The length measuring device as defined in claim 10, wherein:
said pendulum body is suspended from said pendulum support frame by means of a tension band.

27. The length measuring device as defined in claim 10, wherein:
said pendulum body is suspended from said pendulum support frame by means of a tension cord.

28. A length measuring device for determining when a desired length of a thread has been wound up on a cross-wound package in a thread-winding device, especially a textile thread, wherein the diameter of the cross-wound package is sensed and each revolution thereof is sensed, comprising:
a measuring system including:
a diameter sensor for sensing the diameter of the cross-wound package and for generating a diameter size signal indicative of the sensed diameter;
at least one revolution sensor for sensing each revolution of the cross-wound package and for generating a revolution count signal indicative of each sensed revolution;
the thread-winding device having kinematic characteristics and the cross-wound package having geometric characteristics representable by predeterminate parameters;
a parameter register system for containing said predeterminate parameters relative to the thread-winding device and to the cross-wound package and for transmitting parameter signals indicative of said predeterminate parameters;

a control system for controlling a predetermined device;

said measuring system being connected to said control system and to said parameter register system;

said predeterminate parameters including a reference value of the length of the thread corresponding to the desired length of the thread;

said measuring system being provided for processing said diameter size signal of said diameter sensor and said revolution count signal of said revolution sensor as well as said parameter signals of the parameter register system indicative of momentary values of said geometric and kinematic characteristics and for generating therefrom an output signal indicative of substantial equality between a momentary value of the length of thread wound up on the cross-wound package and said reference value and for transmitting said output signal to said control system;

the cross-wound package comprising a winding tube having a predetermined diameter;

said measuring system further including:
a multiplier having a first input, a second input and an output;
an adder having a first input, a second input and an output;
an AND-gate having a first input, a second input and an output;
a summing integrator having an input and an output;
a comparator having a first input, a second input and an output;

said first input of said multiplier being connected to said diameter sensor;

said predetermined parameters including a value of said predetermined diameter of said winding tube of said cross-wound package;

said second input of the multiplier being connected to said parameter register system for receiving said value of said predetermined diameter of said winding tube of said cross-wound package;

said first input of said adder being connected to said output of the multiplier;

said predeterminate parameters contained in the parameter register system including a winding value indicative of a winding angle of the thread being wound;

said second input of the adder being connected to the parameter register system for inputting said winding value therefrom;

said first input of said AND-gate being connected to said output of the adder;

said second input of the AND-gate being connected to said revolution sensor of the cross-wound package;

said input of said summing integrator being connected to said output of the AND-gate for determining a actual value of an accumulated length of the thread wound on the cross-wound package and for transmitting a signal indicative of said actual value of said accumulated length to said first input of said comparator;

said predeterminate parameters including a reference value of the length of the thread corresponding to the desired length of the thread;

said second input of the comparator being connected to the parameter register system for inputting said reference value of the length of the thread;

said control system being connected to said output of the comparator; and the comparator being provided for comparing said actual value of said accumulated length with said reference value and for generating and transmitting said output signal to the control system upon determining that said substantial equality between said actual value of said accumulated length and said reference value of the length has been attained.

29. A length measuring device for determining when a desired length of a thread has been wound up on a cross-wound package in a thread-winding device, especially a textile thread, wherein the diameter of the cross-wound package is sensed and each revolution thereof is sensed, comprising:

a measuring system including:
a diameter sensor for sensing the diameter of the cross-wound package and for generating a diameter size signal indicative of the sensed diameter;
at least one revolution sensor for sensing each revolution of the cross-wound package and for generating a revolution count signal indicative of each sensed revolution;

the thread-winding device having kinematic characteristics and the cross-wound package having geometric characteristics representable by predeterminate parameters;

a parameter register system for containing said predeterminate parameters relative to the thread-winding device and to the cross-wound package and for transmitting parameter signals indicative of said predeterminate parameters;

a control system for controlling a predetermined device;

said measuring system being connected to said control system and to said parameter register system;

said predeterminate parameters including a reference value of the length of the thread corresponding to the desired length of the thread; and said measuring system being provided for processing said diameter size signal of said diameter sensor and said revolution count signal of said revolution sensor as well as said parameter signals of the parameter register system indicative of momentary values of said geometric and kinematic characteristics and for generating therefrom an output signal indicative of substantial equality between a momentary value of the length of thread wound up on the cross-wound package and said reference value and for transmitting said output signal to said control system;

a winding drum having a predetermined diameter for driving the cross-wound package;

the cross-wound package being subject to a slippage relative to the winding drum driving said cross-wound package and guiding said thread; and said measuring system comprising a compensating measurement system operatively connected with said measuring system, said parameter register system and said control system for compensating the length measurement for said slippage.

30. A length measuring device for determining when a desired length of a thread has been wound up on a cross-wound package in a thread-winding device, especially a textile thread, wherein the diameter of the cross-wound package is sensed and each revolution thereof is sensed, comprising:

a measuring system including:

a diameter sensor for sensing the diameter of the cross-wound package and for generating a diameter size signal indicative of the sensed diameter;

at least one revolution sensor for sensing each revolution of the cross-wound package and for generating a revolution count signal indicative of each sensed revolution;

the thread-winding device having kinematic characteristics and the cross-wound package having geometric characteristics representable by predeterminate parameters;

a parameter register system for containing said predeterminate parameters relative to the thread-winding device and to the cross-wound package and for transmitting parameter signals indicative of said predeterminate parameters;

a control system for controlling a predetermined device;

said measuring system being connected to said control system and to said parameter register system;

said predeterminate parameters including a reference value of the length of the thread corresponding to the desired length of the thread;

said measuring system being provided for processing said diameter size signal of said diameter sensor and said revolution count signal of said revolution sensor as well as said parameter signals of the parameter register system indicative of momentary values of said geometric and kinematic characteristics and for generating therefrom an output signal indicative of substantial equality between a momentary value of the length of thread wound up on the cross-wound package and said reference value and for transmitting said output signal to said control system;

a multiplier having a first input, a second input and an output;

an AND-gate having a first input, a second input and an output;

a summing integrator having an input and an output;

a comparator;

said summing integrator being provided for continuously determining an actual value of the length of the thread wound up on the cross-wound package;

said first input of said multiplier being connected to said diameter sensor;

said predeterminate parameters including the value $\pi/\cos \alpha$;

said second input of the multiplier being connected to said parameter register system for inputting said value $\pi/\cos \alpha$ from the parameter register system to said multiplier;

said first input of said AND-gate being connected to said output of the multiplier;

said second input of the AND-gate being connected to said revolution sensor of the cross-wound package;

said input of said summing integrator being connected to said output of the AND-gate;

said parameter register system comprising means for selecting said reference value of the length of the thread corresponding to the desired length;

said comparator being connected to said output of the summing integrator for comparing said actual value of the length of the thread wound up on the cross-wound package with said reference value of the length of the thread selected at the parameter register system; and said comparator being provided for generating and for transmitting said output signal to said control system of said predetermined device, said measuring system further includes
a compensating measurement system which comprises:
a winding drum revolution counter;
a winding drum revolution sensor;
a first multiplier having a first input, a second input and an output;
a second multiplier having a first input, a second input and an output;
a third multiplier having a first input, a second input and an output;
a divider having a first input, a second input and an output;
a first subtractor having a first input, a second input and an output;
a second subtractor having a first input, a second input and an output;
an AND-gate having a first input, a second input and an output;
a comparator having a first input, a second input and an output;
a summing integrator having an input and an output;
said first input of said first multiplier being connected to said diameter sensor;
said second input of the first multiplier being connected to said revolution counter of the cross-wound package;
the revolution counter of the cross-wound package being connected to said revolution sensor of the cross-wound package;
said first input of said divider being connected to said output of the first multiplier;
said second input of the divider being connected to said output of said second multiplier;
said first input of the second multiplier being connected to said winding drum revolution counter;
said winding drum revolution counter being connected to said winding drum revolution sensor;
said predeterminate parameters including a value of said diameter of said winding drum;
said second input of the second multiplier being connected to said parameter register system for inputting said value of the predetermined diameter of the winding drum;
said first input of said first subtractor being connected to said output of the divider;
said first input of said third multiplier being connected to said output of the first subtractor;
said predeterminate parameters including a value of a first predetermined constant indicative of a winding angle of the thread being wound;
said second input of the third multiplier being connected to the parameter register system for inputting a signal corresponding to said value of said first predetermined constant;
said first input of said second subtractor receiving an output signal being connected to said output of the third multiplier;
said predeterminate parameters including a second predetermined constant relative to the diameter of the cross-wound package;
said second input of the second subtractor being connected to the parameter register system for inputting a value of said second predetermined constant;

said first input of said AND-gate being connected to said output of the second subtractor;

said second input of the AND-gate being connected to the winding drum revolution counter;

said second subtractor being provided for forming a value;

said output terminal of the AND-gate transmitting said value formed by the second subtractor to said input terminal of said summing integrator upon receiving from said winding drum revolution counter a revolution count signal;

said first input of said comparator being connected to said output of the summing integrator;

said predeterminate parameters including said reference value of the length of the thread corresponding to the desired length;

said second input of the comparator being connected to the parameter register system for inputting said reference value of the length of the thread; and said output of the comparator being provided for transmitting a control signal to said control system as a function of the result of a comparison operation performed by the comparator;

$\alpha$ is the winding angle of the thread being wound; and $\pi$ is the constant value 3.141596.

31. A length measuring device for determining when a desired length of a thread has been wound up on a cross-wound package in a thread-winding device, especially a textile thread, wherein the diameter of the cross-wound package is sensed and each revolution thereof is sensed, comprising:

a measuring system including:

a diameter sensor for sensing the diameter of the cross-wound package and for generating a diameter size signal indicative of the sensed diameter;

at least one revolution sensor for sensing each revolution of the cross-wound package and for generating a revolution count signal indicative of each sensed revolution;

the thread-winding device having kinematic characteristics and the cross-wound package having geometric characteristics representable by predeterminate parameters;

a parameter register system for containing said predeterminate parameters relative to the thread-winding device and to the cross-wound package and for transmitting parameter signals indicative of said predeterminate parameters;

a control system for controlling a predetermined device;

said measuring system being connected to said control system and to said parameter register system;

said predeterminate parameters including a reference value of the length of the thread corresponding to the desired length of the thread;

said measuring system being provided for processing said diameter size signal of said diameter sensor and said revolution count signal of said revolution sensor as well as said parameter signals of the parameter register system indicative of momentary values of said geometric and kinematic characteristics and for generating therefrom an output signal indicative of substantial equality between a momentary value of the length of thread wound up on the cross-wound package and said reference value and for transmitting said output signal to said control system;

a multiplier having a first input, a second input and an output;

an AND-gate having a first input, a second input and an output;

a summing integrator having an input and an output;

a comparator;

said summing integrator being provided for continuously determining an actual value of the length of the thread wound up on the cross-wound package;

said first input of said multiplier being connected to said diameter sensor;

said predeterminate parameters including the value $\pi/\cos \alpha$;

said second input of the multiplier being connected to said parameter register system for inputting said value $\pi/\cos \alpha$ from the parameter register system to said multiplier;

said first input of said AND-gate being connected to said output of the multiplier;

said second input of the AND-gate being connected to said revolution sensor of the cross-wound package;

said input of said summing integrator being connected to said output of the AND-gate;

said parameter register system comprising means for selecting said reference value of the length of the thread corresponding to the desired length;

said comparator being connected to said output of the summing integrator for comparing said momentary value of the length of the thread wound up on the cross-wound package with said reference value of the length of the thread selected at the parameter register system; and said comparator being provided for generating and for transmitting said output signal to said control system of said predetermined device, said measuring system further includes a compensating measurement system which comprises:

said parameter register system;

a revolution counter of the cross-wound package;

a winding-drum revolution counter;

a first multiplier having a first input, a second input and an output;

a second multiplier having a first input, a second input and an output;

a third multiplier having a first input, a second input and an output;

a divider having a first input, a second input and an output;

a subtractor having a first input, a second input and an output;

a first AND-gate having a first input, a second input and an output;

a second AND-gate having a first input, and a second input;

a summing integrator having an input and an output;

a comparator having a first input, a second input and an output;

said first input of said first multiplier being connected to said output of said divider;

said predeterminate parameters including a value of a predetermined diameter of said winding drum;

said first input of said divider being connected to said parameter register system for inputting said value of said predetermined diameter of the winding drum;

said second input of the divider being connected to said diameter sensor;

said second input of the first multiplier being connected to said revolution counter of the cross-wound package;

the revolution counter of the cross-wound package being connected to said revolution sensor of the cross-wound package;

said output of the first multiplier being provided for transmitting a signal to said first input of said subtractor;

said second input of the subtractor being connected to said winding drum revolution counter;

said first input of said second multiplier being connected to said output of the subtractor;

said predeterminate parameters including a value of a factor indicative of the winding angle of the thread being wound;

said second input of the second multiplier being connected to the parameter register system for inputting said value of said factor indicative of the winding angle of the thread;

said first input of said first AND-gate being connected to said output of the second multiplier;

said second input of said first AND-gate being connected to the winding drum revolution counter;

said output of said first AND-gate being provided for transmitting a signal to said input of said summing integrator;

said input of the summing integrator being connected to said first input of said second AND-gate;

said second input of the second AND-gate being connected to said output of said third multiplier;

said predeterminate parameters including the value $\pi/\cos\alpha$;

said first input of the third multiplier being connected to the parameter register system for inputting therefrom said value $\pi/\cos\alpha$;

said second input of the third multiplier being connected to the diameter sensor;

the summing integrator being provided for determining in dependence of a counted number of revolutions of the cross-wound package and together with an output signal of the third multiplier a value of the total length of the thread wound on the winding drum;

said output of the summing integrator being provided for transmitting said value of the total length of thread as a signal to said first input of said comparator;

said predeterminate parameters including said value of said reference length;

the comparator being provided for performing a comparison operation by comparing said signal of the summing integrator to said value of said reference length of the thread supplied by the parameter register system to said second input of the comparator; and said output of the comparator being provided for transmitting a control signal corresponding to the result of said comparison operation performed by the commparator to said control system;

$\alpha$ is the winding angle of the thread being wound; and $\pi$ is the constant value 3.141596.

* * * * *